April 9, 1940.　　C. G. BRANSTRATOR　　2,196,954
CHASSIS CONSTRUCTION
Filed June 6, 1938　　4 Sheets-Sheet 1
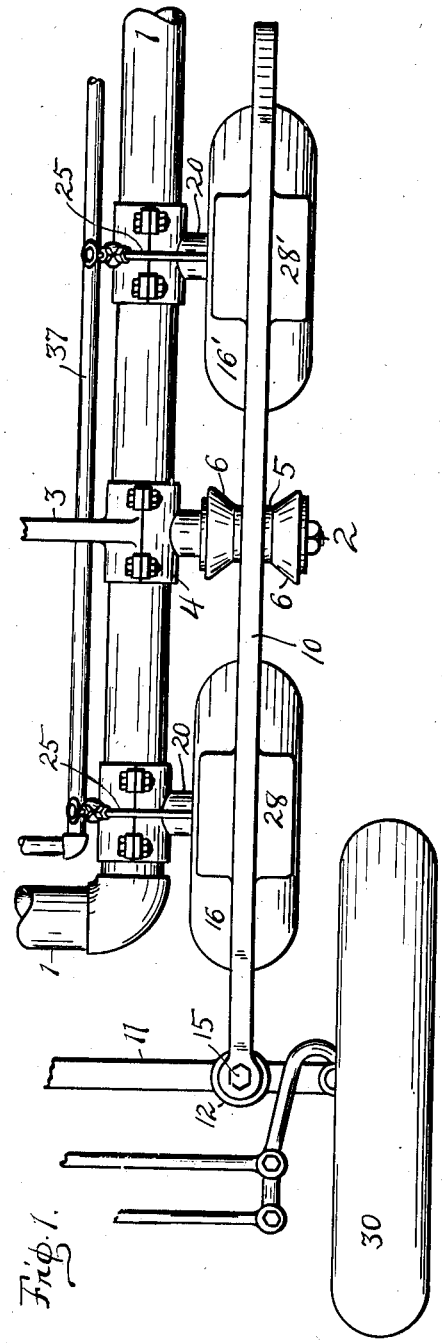
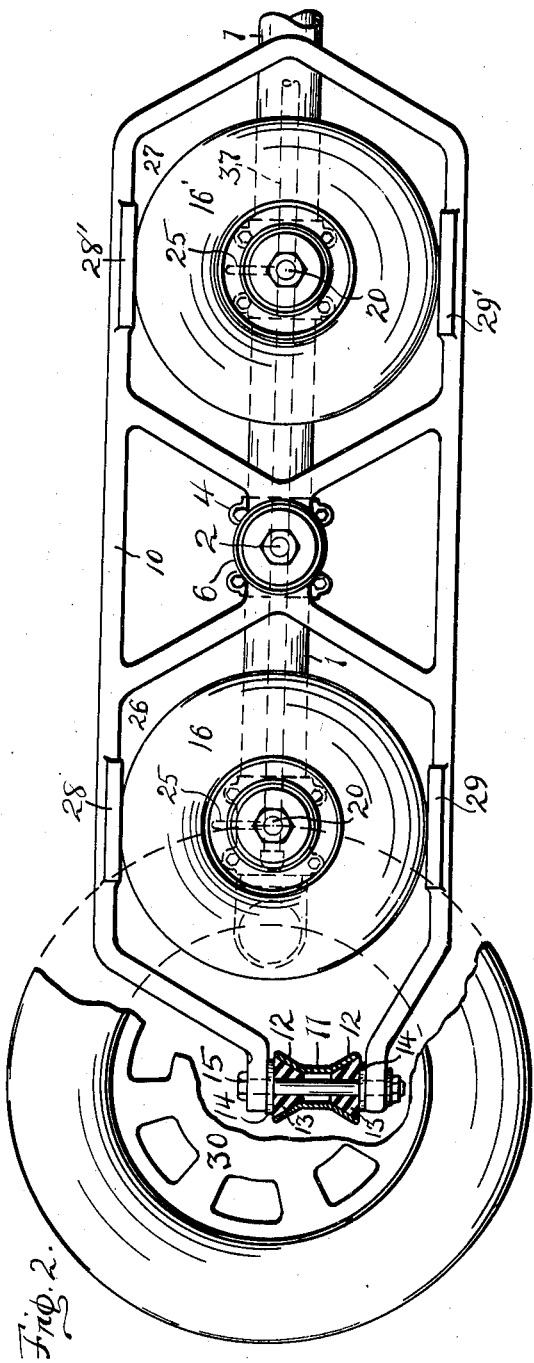
INVENTOR.
CLEM G. BRANSTRATOR
BY
　　　　　　ATTORNEY.

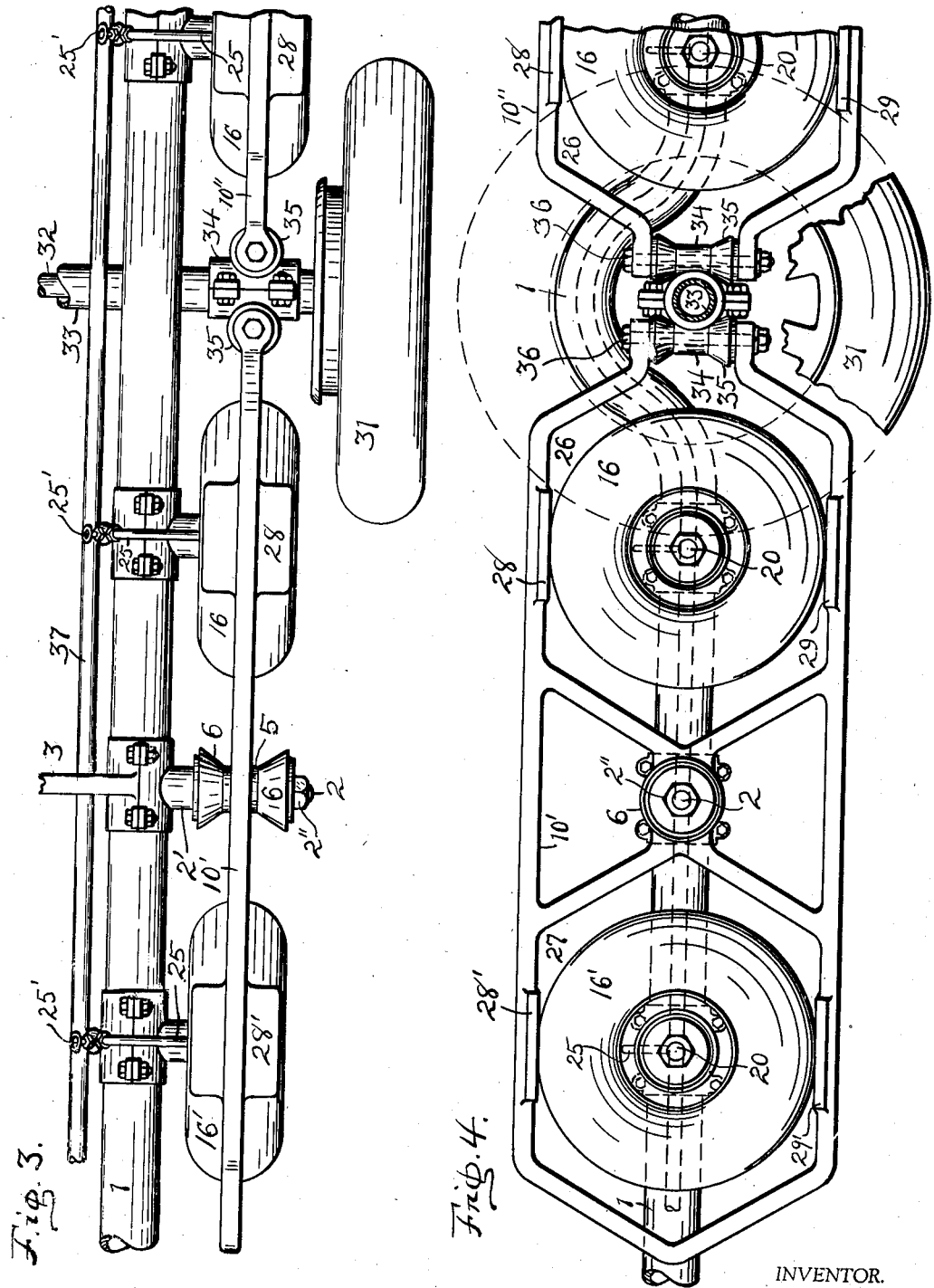

April 9, 1940.　　　C. G. BRANSTRATOR　　　2,196,954
CHASSIS CONSTRUCTION
Filed June 6, 1938　　　4 Sheets-Sheet 3
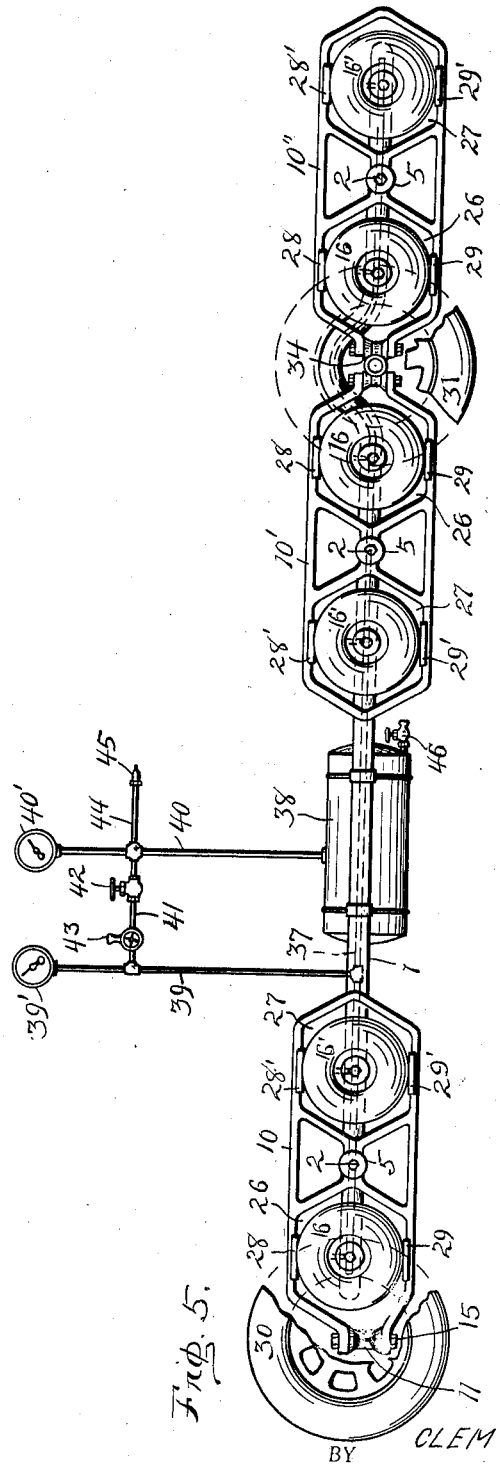
INVENTOR.
CLEM G. BRANSTRATOR
BY
ATTORNEY.

April 9, 1940.                    C. G. BRANSTRATOR                    2,196,954
                                  CHASSIS CONSTRUCTION
                                  Filed June 6, 1938                4 Sheets-Sheet 4
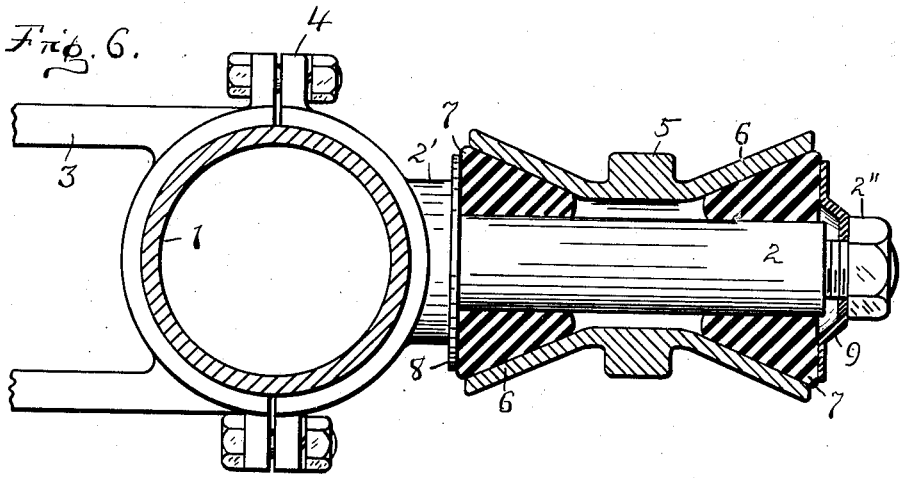
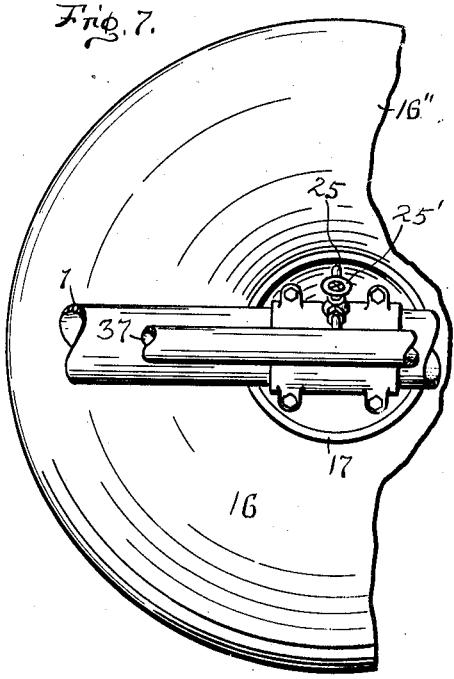
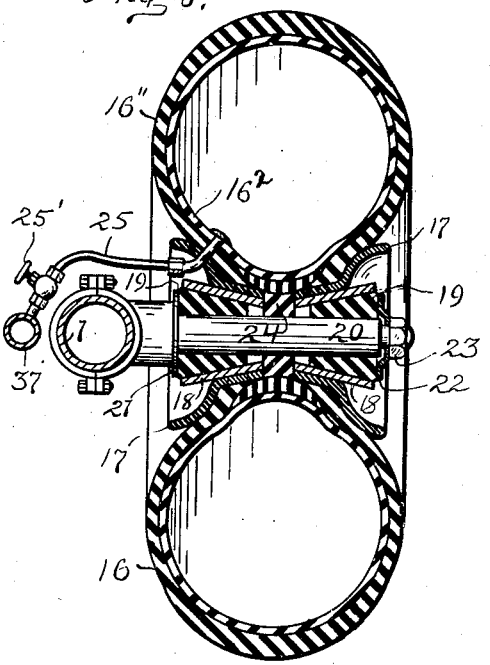
INVENTOR.
CLEM G. BRANSTRATOR.
BY
  ATTORNEY.

Patented Apr. 9, 1940

2,196,954

UNITED STATES PATENT OFFICE 2,196,954

CHASSIS CONSTRUCTION

Clem G. Branstrator, Fort Wayne, Ind., assignor of one-half to Herschel J. Fogwell, Fort Wayne, Ind.

Application June 6, 1938, Serial No. 212,077

9 Claims. (Cl. 280—124)

This invention relates to chassis construction, and one of the features of the invention is the provision of pneumatic and resilient cushioning means to support the chassis frame in proper relation with the axles thereof, so arranged as to absorb shocks occasioned by irregularities in the road surface during travel of a vehicle thereover.

Another object of the invention is to construct the shock absorbing structure so that when any of the ground wheels of the vehicle encounter an irregularity in the road surface the impact occasioned thereby is readily absorbed universally by the cushioning means provided for all of the other ground wheels.

Ordinarily, provision is made for local absorption of shocks that are occasioned by the individual wheels of a vehicle upon encountering obstructions or irregularities on the roadway. In the present instance, however, the purpose is to provide means to absorb jolts received by any one of the ground wheels in such manner that the burden of the shock is distributed universally by the shock absorbing means to all of the other ground wheels, thus to preserve equilibrium of the vehicle.

A further object of the invention is to provide, for a wheeled vehicle structure, cushioning means connected with the chassis frame and axles of the vehicle so constituted as to absorb concussion occasioned by impact of the ground wheels with irregularities or obstructions encountered on the roadway, and also to snub the reactions of the movable parts that follow the actions occasioned by the direct impacts.

Other objects and advantages of the invention appear in the following description.

An illustrative embodiment of the invention is shown in the accompanying drawings, in which:

Fig. 1 is a fragmentary plan view of the front portion of a chassis in which the invention is incorporated;

Fig. 2 is an elevation projected from Fig. 1;

Fig. 3 is a fragmentary plan view of a rear portion of the chassis;

Fig. 4 is an elevation projected from Fig. 3;

Fig. 5 is a fragmentary view showing an elevation of the chassis including means for storing air under pressure used in the apparatus.

Fig. 6 is a detail view, in vertical section, of a resilient mount on the chassis frame for a shackle that forms part of the structure;

Fig. 7 is a fragmentary view of a pneumatic cushion member and its connection with the frame of the chassis; and Fig. 8 is a cross-sectional view projected from Fig. 7.

The illustrative embodiment of the invention consists of a chassis frame, pneumatic ground wheels disposed in pairs on corresponding axles, shackle frames, resilient supports on the chassis frame for said shackles, cushioned connections between said shackles and the corresponding axles, pneumatic members having supported connection with said chassis frame engaging the corresponding shackles, and means for inflating said pneumatic members uniformly under air pressure.

Preferably, as illustrated in the drawings, the chassis frame 1 is of tubular construction and has secured thereon horizontally disposed studs 2 that are connected also with cross braces 3 by means of clamps 4, said brackets extending from one side of the chassis frame to the other. Said studs project outwardly from the corresponding sides of the chassis frame and have mounted concentrically thereon cushion members (Fig. 6) that preferably are constituted of cylindrical shells 5 the ends of which are made conical to provide corresponding pockets 6 in which are positioned resilient cones 7 preferably formed of rubber, and on said studs adjacent the outer ends of said cones are disposed corresponding washers 8 and 9. The ensembles forming the cushion members are clamped on the corresponding studs 2, between the shoulder 2' and a nut 2" provided on each stud, by which the cushion members are firmly held in position.

The cushion members thus positioned upon the studs constitute mounts, and thereupon are secured corresponding shackles 10, 10' and 10'' that are bolted upon the shells 5. Because of the yielding nature of the resilient cones 7, the shackles have more or less restrained play in all directions relative to the stud, upon which the cushion member is mounted, whereby is permitted absorption by the resilient cones of opposing vibratory movements as between the studs and the shackles that develop during travel of the vehicle on the roadway.

The shackle 10 is constituted of a frame (Figs. 1 and 2) the forward end of which is bifurcated and is disposed astride the front axle 11 of the vehicle, the axle being so shaped as to provide conical pockets 12 in its top and bottom, in which pockets are disposed resilient cones 13.

Washers 14 bear against the outer ends of the cones, and anchor bolts 15 extend concentrically through the axle, washers and cones and the corresponding bifurcated ends of the shackles. Thus, the forward ends of the shackles, because of the yielding nature of the cones, have limited relative movement with respect to the axle in all directions whereby absorption of relative vibration therebetween is effected.

Movement of the shackle frames 10 about their supporting studs 2 is limited by means of shock absorbing members that preferably consist of inflated cushions 16 and 16' that are mounted upon hubs 17 having in the ends thereof pockets 18 in which are disposed conical resilient cones 19 that are mounted concentrically upon corresponding studs 20 that are secured to and project outwardly from the chassis frame 1.

There are provided on said studs, washers 21 and 22 that bear against the outer ends of the cones 19 with more or less force, there being a nut 23 on the outer end of each stud 20 by which the assembled parts are held firmly together. A resilient filler 24 is positioned on each stud 20 between the inner ends of the pockets 18 and inner ends of the hub members 17.

The resilient cushions 16 preferably are in the form of a pneumatic tire having an inner inflated tube $16^2$ confined within a surrounding case 16" (Figs. 7 and 8) that is mounted upon the hub 17 and is provided with a valve stem 25 through which the tube is supplied with air under pressure.

The shackle frames 10 each have forward and rear openings 26 and 27 in which the corresponding resilient cushions 16 and 16' extend, and there are provided on said frames upper and lower contact plates 28—29 and 28'—29' between which the corresponding resilient cushions are snugly disposed. By this means angular movements of the shackles about their supporting studs 2 in either direction are resiliently restrained. Thus, upon sudden vertical movements of the front ground wheels 30 of the vehicle, which occur when traveling over an uneven road surface, the attendant shock, upon sudden upward movement of the ground wheel is absorbed by pressure of the contact plates 29 against the bottoms of the resilient cushion 16 and concurrent downward pressure of the contact plates 28' upon the tops of the resilient cushions 16', and the subsequent reactionary drop of the ground wheel is snubbed by downward pressure of the contact plates 28 upon the tops of the cushions 16 and concurrent upward pressure of the contact plates 29' against the bottoms of the cushions 16'. Upon sudden dropping of the ground wheels and reaction thereof, the pressure of the contact plates against their respective resilient cushions is then in the reverse direction respecting the former instance, with similar effect.

The rear ground wheels 31 of the vehicle (Figs. 3 and 4) are mounted upon an axle 32 that extends through an axle housing 33 upon the outer end portions of which are secured corresponding anchor blocks 34 that are each provided with vertically disposed pockets 35, said pockets being similar to those formed in the front axle and having disposed therein corresponding resilient cones, the same as the cones 19 in the pockets formed in the front axle.

The shackles 10' and 10'' are mounted respectively upon the cushion members on the corresponding studs 2. One end of each of the shackles 10' and 10'' is bifurcated and is disposed astride the corresponding resilient members on the anchor block 34 and is secured in connection therewith by a bolt 36. These shackles are of the same general construction as the shackles 10 and have openings 26 and 27 in which corresponding resilient cushions 16 and 16' extend and have bearing contact with said shackles as in the former instance.

The ground wheels 30 and 31 preferably are of the rubber tire type such as is ordinarily employed in automobile practice, and as the shackles are connected with the front axle and rear axle housing and with the chassis frame indirectly through the medium of resilient cushion members, the chassis frame thus is maintained in operating position in such manner as to be substantially free from vibrations that ordinarily are caused by travel of the vehicle over irregular or rough roadway surfaces.

As a means for universally supplying and maintaining uniform air pressure in the cushions 16 and 16', a pipe 37 constituting a manifold is arranged in connection with the valve stems 25 of all of said cushion members, and a storage tank 38 is conveniently mounted on the chassis frame for the storage of a quantity of air under pressure. The manifold 37 and the storage tank 38 have connected respectively thereto corresponding service pipes 39 and 40, each of which has mounted thereon a pressure gauge 39'—40', and said pipes are joined by a cross connecting pipe 41 provided with a shut-off valve 42. Also, there is provided a pet-cock 43 connected in the pipe 41 between the shut-off valve and the pipe 39, which when opened, relieves the air pressure from the manifold 37.

A feed pipe 44 is connected with the pipe 40 and has a filler cap 45 through which air is supplied under pressure to the tank 38 from any suitable source of supply (not shown). The pressure of air established in the tank is indicated by the gauge 40'. The tank 38 also has a blow-off cock 46 for draining from the tank condensations that may accumulate therein. Air is admitted from the tank 38 into the manifold 37 by closing the pet-cock 43 and opening the shut-off valve 42 until the pressure in the manifold and the cushions 16 and 16' connected therewith reaches the desired pressure, which pressure is indicated by the gauge 39', after which the valve 42 is closed. It is desirable that the air pressure held in reserve in the tank 38 is considerably higher than that maintained in the inflated cushions so that any loss of air from said manifold or cushions may be replaced by manipulating the shut-off valve 42.

The valve stem 25 of each inflated cushion has connected therein an individual shut-off valve 25' by which communication between the manifold 37 and the cushions may be selectively closed which is desirable in the event any of the cushions develop a leak. Thus, by shutting off the air from the faulty cushion the air pressure of the other cushions is still retained while repair is made to restore the leaky cushion.

In the event the pressure of air in the cushions is found to be higher than necessary for proper operation, which would occur when the load on the vehicle is removed or greatly reduced, the excess pressure of air may then be relieved by opening the pet-cock 43 until the pressure in the cushions is suitably lowered. Upon increasing the load on the vehicle necessitating higher pressure in the cushion members to properly sustain the load, the shut-off valve 42 is then opened, whereupon air from the storage tank 38 is supplied to the manifold and the cushion members attached thereto. Thus, the pressure in the cushion members is raised to a desired point as shown by the gauge 39' after which the shut-off valve 42 is again closed.

*Operation*

In operating the apparatus, it is preferable to initially inflate the cushion members with air to a desired pressure while the tank is being charged from an available source through the filler cap, and while the shut-off valve 42 is open. When the gauge 39' indicates the pressure to have reached the desired point, the shut-off valve 42 is closed after which the supply of air to the tank is continued until the pressure therein reaches its maximum capacity and accordingly indicated by the gauge 40'. An objective is to at all times maintain in the tank 38 storage of air under higher pressure than the maximum pressure required in the cushion members, in order to always have available a sufficient supply of air for replacement of escaped or released air from the cushion members. By this arrangement the resiliency of the supporting means for the chassis frame is maintained irrespective of variations in the weight of the load on the vehicle.

As the cushion members and the shackles are resiliently supported in their respective connections with the chassis frame, said shackles 10 being connected with the front axle through the medium of resilient members, the shackles 10' and 10'' likewise being connected with the housing for the rear axle through the medium of resilient members, and the ground wheels being rubber-tired, there is established a complete rubber floating support for the chassis frame by which is forestalled transmission to the frame vibrations occasioned by travel of the ground wheels over irregularities in the surface of the roadway. Also, as the air pressure in the inflated cushion members is maintained universally through their valve stems and the manifold connected therewith, stress on any one of said cushions, or group of said cushions, is borne collectively by said cushions because of the intercommunication of air through their valve stems and the manifold.

Variations from the particular construction above disclosed may readily be made by exercise of engineering skill without departure from the spirit or scope of the invention, and the following claims are intended to be inclusive of such variations.

What I claim is:

1. In a vehicle chassis construction, a chassis frame having studs extending horizontally from the sides thereof, cushion members on certain of said studs, a shackle secured on each cushion member, a front axle provided with other cushion members that are connected with the corresponding forward ends of the shackles adjacent thereto having ground wheels on its ends, a rear axle housing provided near its ends with corresponding cushion members that are connected respectively with the ends of the shackles adjacent thereto, a rear axle journaled in said housing provided with ground wheels on its ends, pneumatic cushions provided with axial cushion members secured on corresponding studs on said frame, said pneumatic cushions having contact at their tops and bottoms with said shackles respectively adapted to yieldingly oppose angular movements of said shackles upon their pivotal supports in opposite directions, a manifold air pipe having connections with the valve stems of said pneumatic cushions, a service pipe connected with said manifold and provided with a pressure gauge, an air pressure storage tank on the chassis having a service piping provided with a pressure gauge and fill cap, a pipe connection between said piping and the first mentioned service pipe provided with a shut-off valve, a pet-cock for release of air from said manifold, and individual shut-off valves for the connections between said manifold and pneumatic cushions.

2. A vehicle chassis consisting of a frame having laterally extending studs, cushion members on certain of said studs, a shackle secured on each cushion member, a front axle provided with other cushion members that are connected with the corresponding ends of the shackles adjacent thereto, having ground wheels on its ends, a rear axle housing provided near its ends with corresponding cushion members that are connected respectively with the ends of the shackles adjacent thereto, a rear axle journaled in said housing provided with ground wheels on its ends, pneumatic cushions provided with axial cushion members secured on corresponding studs on said frame, said pneumatic cushions having contact at their tops and bottoms with said shackles respectively adapted to yieldingly oppose angular movements of said shackles in opposite directions relative to the studs on which said shackles are mounted, a manifold air pipe having connections with the valve stems of said pneumatic cushions, individual shut-off valves for said connections, and an air pressure storage means on the chassis having a valve-controlled connection with said manifold, there being provided a pet-cock for release of air pressure from said manifold.

3. A chassis including a frame, wheeled front and rear axles, and a housing for the rear axle, shackles mounted in connection with the chassis frame and correspondingly with the front axle and housing, cushion members in the respective connections for the shackles and frame, for said axle and corresponding shackles, and for said housing and the shackles connected thereto, pneumatic cushions in supported connection with the chassis frame having contact at their tops and bottoms respectively with the corresponding shackles adapted to yieldingly oppose movements thereof in opposite directions relative to said frame, an air pressure storage tank on the chassis, an air pipe system connected with said tank provided with a shut-off valve and including a manifold connected with the valve-stems of all of said pneumatic cushions, individual shut-off valves for the connections between the manifold and said valve-stems, and a pet-cock connected with the system for releasing air therefrom.

4. A chassis including a frame, wheeled front and rear axles, and a housing for the rear axle, shackles mounted in connection with said frame and correspondingly with the front axle and housing, cushion members in the respective connections for the shackles and frame, for said axle and corresponding shackles, and for said housing and the shackles connected thereto, pneumatic cushions in supported connection with said frame having contact at their tops and bottoms respectively with the corresponding shackles adapted to yieldingly oppose movements in opposite directions thereof relative to said frame, means carried by the chassis and connected with said pneumatic cushions for supplying air universally to said cushions under pressure and to vary said pressure, and individual shut-off valves for the connections between said pneumatic cushions and said means.

5. A chassis including a frame, wheeled front and rear axles, and a housing for the rear axle, shackles mounted in connection with said frame and correspondingly with the front axle and housing, cushion members in the respective connections for the shackles and frame, for said axle and corresponding shackles, and for said housing and the individual shackles connected therewith, pneumatic cushions in supported connection with said frame having contact at their tops and bottoms respectively with the corresponding shackles adapted to yieldingly oppose movement thereof in opposite directions relative to said frame, pneumatic cushions supported by said frame contacting respectively with the corresponding shackles, a manifold air pipe having connections respectively with said cushions affording intercommunication of air pressure therebetween, individual shut-off valves for the connections between said manifold and pneumatic cushions, an air pressure storage tank carried by the chassis provided with an outlet shut-off valve and having connection with said manifold, and a pet-cock for the release of air in said manifold.

6. A chassis including a frame, wheeled front and rear axles, and a housing for the rear axle, shackles mounted in connection with said frame and correspondingly with the front axle and housing, cushion members in the respective connections for the shackles and frame, for said axle and corresponding shackles, and for said housing and the individual shackles connected therewith, pneumatic cushions in supported connection with said frame having contact at their tops and bottoms respectively with the corresponding shackles adapted to yieldingly oppose movement thereof in opposite directions relative to said frame, pneumatic cushions supported by said frame contacting respectively with the corresponding shackles, a manifold air pipe having connections respectively with said cushions affording intercommunication of air pressure therebetween, individual shut-off valves for the connections between said manifold and pneumatic cushions, and means for supplying air under pressure to said manifold.

7. A chassis including a frame, wheeled front and rear axles, and a housing for the rear axle, shackles mounted in connection with said frame and correspondingly with the front axle and housing, cushion members in the respective connections for the shackles and frame, for said axle and corresponding shackles, and for said housing and the individual shackles connected therewith, pneumatic cushions in supported connection with said frame having contact at their tops and bottoms respectively with the corresponding shackles adapted to yieldingly oppose movement in opposite directions thereof relative to said frame, pneumatic cushions supported by said frame contacting respectively with the corresponding shackles, a manifold air pipe having connections respectively with said cushions affording intercommunication of air pressure therebetween, and means for supplying air under pressure to said manifold and for varying said pressure.

8. A chassis including a frame, wheeled front and rear axles, and a housing for the rear axle, cushion members supported on said frame, shackles mounted respectively on said cushion members connected correspondingly with the front axle and housing, other cushion members in the respective connections for the shackles and said axle, and for the housing and the individual shackles connected therewith, pneumatic cushions in supported connection with the frame having engagement with the corresponding shackles whereby to yieldingly oppose relative movement in opposite directions with respect to the shackles and frame, a manifold air pipe having connections respectively with said pneumatic cushions affording intercommunication of air pressure therebetween, and means for supplying air under pressure to said manifold, and for varying said pressure.

9. A chassis including a frame, wheeled front and rear axles, and a housing for the rear axle, cushion members supported on said frame, shackles mounted respectively on said cushion members connected correspondingly with the front axle and housing, other cushion members in the respective connections for the shackles and said axle, and for the housing and the individual shackles connected therewith, pneumatic cushions in supported connection with the frame having engagement with the corresponding shackles whereby to yieldingly oppose relative movement in opposite directions with respect to the shackles and frame, and a manifold air pipe in which air under pressure is maintained having connections respectively with said pneumatic cushions whereby the pressure of air in said cushions is maintained universally with respect thereto.

CLEM G. BRANSTRATOR.